July 19, 1966 MASAO KAWASHIMA ETAL 3,261,986

DIGITAL CODE REGENERATIVE RELAY TRANSMISSION SYSTEM

Filed April 19, 1963 2 Sheets-Sheet 1

United States Patent Office 3,261,986
Patented July 19, 1966

3,261,986
DIGITAL CODE REGENERATIVE RELAY TRANSMISSION SYSTEM

Masao Kawashima, Yokohama-shi, and Tsukumo Higeta, Isao Fudemoto, and Atushi Miki, Kawasaki-shi, Japan, assignors to Fujitsu Limited, Kawasaki, Japan, a corporation of Japan Filed Apr. 19, 1963, Ser. No. 274,287
6 Claims. (Cl. 307—88.5)

Our invention relates to wave-shape and pulse-shape regenerating repeaters, particularly for pulse code modulation communication systems.

Pulse transmission systems using binary code, such as pulse code modulation (PCM) communication systems, are characterized by a high noise tolerance. They permit the use of regenerative repeaters which produce little or no accumulation of noise and distortion, as long as the distortion and signal-to-noise ratio of the channel does not deteriorate below a given "threshold level." Such systems offer very effective transmission links for long-distance radio communication, super wide-band millimeter wave transmission and various other carrier systems used in a noisy channel.

Regenerative repeaters in digital code transmission systems detect the existence of coded pulses by applying an incoming pulse train containing noise and distortion into a coincidence gate together with a timing signal, and then regenerate the original coded pulses. The retiming process and waveform regeneration process produce code errors and wave form distortion such as pulse position jitter. Their factors are noise and cross-talk in the line and amplifier, waveform distortion due to remainder equalization, change of average D.-C. component, and amplitude and phase variations of the timing wave. As a rule, the transmission quality and the maximum permissible inter-relay distances are determined by the code error rate and the wave distortion in the regenerating process of the repeater.

It is an object of this invention to provide a regenerative repeater system for digital code transmission having improved transmission quality and larger permissible inter-relay distances. More particularly it is an object to provide such a repeater having an improved code-error rate while nevertheless eliminating more wave distortion in the regenerating process than has been hitherto possible.

Repeaters of the known type exhibit the effects of changes in the average D.-C. level of signals. This is caused in part by the input and output transformers which are necessary for balance-unbalance conversion, impedance matching and power separation. They cause the D.-C. level to vary according to code content. Other D.-C. level variations arise from channel noise, particularly low frequency noise from the power supply or dial impulses. Thus, it is another object of the invention to limit D.-C. level variations and to suppress channel noise in repeaters, especially low frequency power-supply or dial noises.

In known devices before the input pulse train is detected by timing signals in the coincidence gate, it is equalized. Another object of the invention with reference to such equalization shaping of input signals and combination with timing waves in the regenerative repeater is to furnish a stable wave-form regenerating system eliminating the variation of average D.-C. components in the pulse train, particularly while increasing the code detection accuracy.

Regenerating systems of such repeaters operating with the above-mentioned timing signals are of two types, namely, the separate-signal retiming type in which timing pulses are transmitted separately for comparison with the transmitted information pulses, and the self-retiming type wherein timing pulses are regenerated or formed from either the input pulse train or the regenerated pulse train. It is still another object to furnish a repeater system accomplishing the other objects with either of the two types of timing signals.

The invention, its other objects, advantages and features will be discussed relative to the accompanying drawings wherein.

Figure 1:
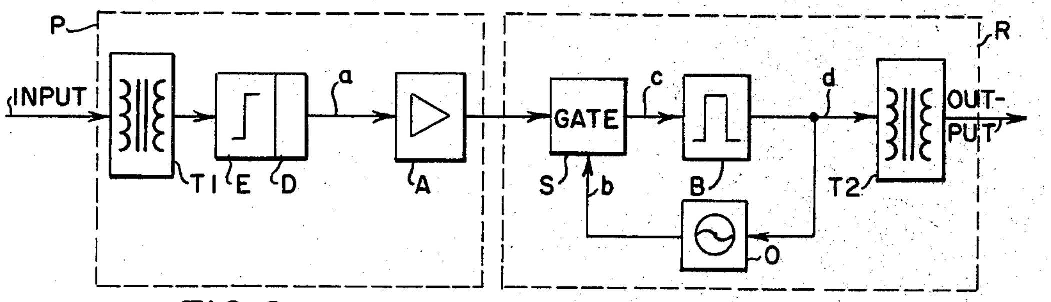
FIG. 1 is a block diagram of a self-timing regenerative repeater embodying features of the invention, for use in pulse code modulation communication systems.
Figure 2:
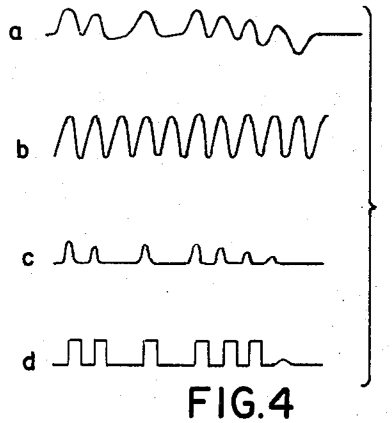
FIG. 2 is a group of voltage-time graphs *a* to *d* of waveforms which would exist in the circuit of FIG. 1 at points marked *a* to *d* if the features of the invention were not present.
Figure 5:
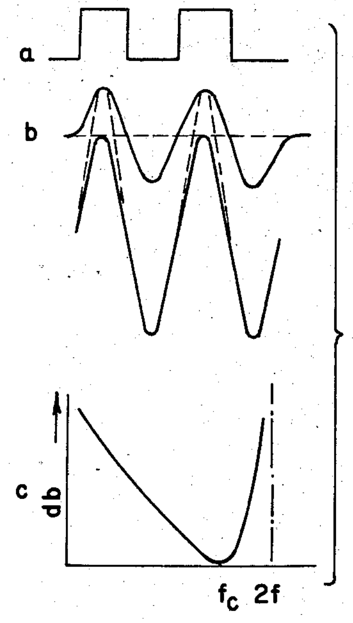
FIG. 5 is a group of graphs *a* to *c* showing the equalized waveforms, the summing process of the timing wave and the equalization shaping characteristics, in the system according to the present invention as shown in FIG. 1.

In FIG. 1, the repeater according to the invention is comprised of a pre-circuit P and a regenerative circuit R. In the pre-circuit P an input transformer T1 receives a coded pulse train transmitted through a channel containing noise and distortion and applies it to an input equalizer E which in turn has its output amplified by an amplifier A. The latter three, or a combination of the equalizer E with either of the other two, or the equalizer alone, equalize and shape the coded pulses into the band limited waves having orthogonal characteristics relative to the adjacent pulses. The circuit P accomplishes differentiation so that input signals which would otherwise have the waveform of curve *a* in FIG. 2 are changed therefrom to the waveform illustrated in curve *a* of FIG. 3. The pre-circuit P has an equalization characteristic as shown in FIG. 5, graph *c*. The signal *a* of FIG. 3 is applied to the regeneration circuit R having its input at a gate or timing circuit S.

Figure 3:
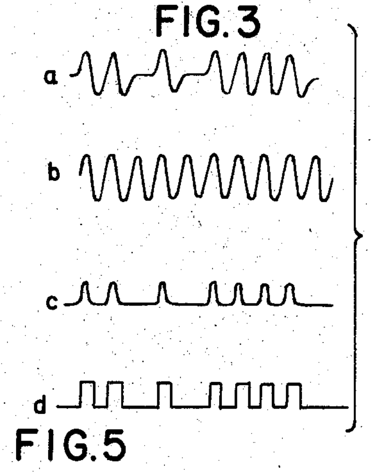
FIG. 3 is a group of voltage-time graphs *a* to *d* showing the waveforms of points *a* to *d* in the regenerating system according to FIG. 1 which embodies the features of this invention.

The timing circuit S detects the amplified signals at their correct time position by means of timing pulses or timing waves *b* illustrated in FIG. 3 and thus regenerates the original binary pulse wave in the form *c* of FIG. 3. The timing circuit or gate S accomplishes this by producing an output only when the timing wave coincides with one of the pulses. The output pulses *c* of FIG. 3 trigger a regenerative amplifier B which is composed of a monostable multivibrator or blocking oscillator. A transformer T2 transmits the regenerated pulses out to the next line and the following relay or repeater.

The output pulses of the amplifier B have the wave shape *d* in FIG. 3 and are further applied to a timing wave generating circuit which may comprise an oscillator which is locked in proper phase and frequency by the pulses *c* of FIG. 3. The output of generator O is applied as one of the inputs to the coincidence gate S.

Figure 6:
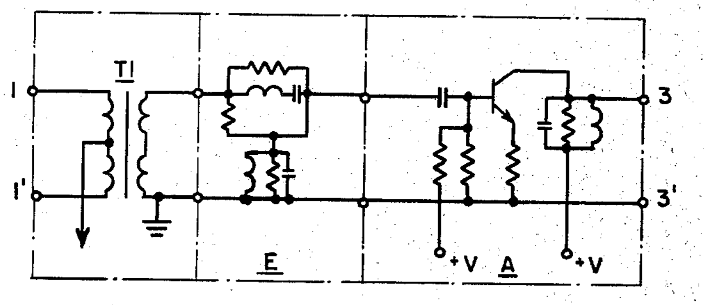
FIG. 6 is a detailed circuit diagram of the pre-circuit forming a part of the regenerative receiver according to the invention, and as shown in FIG. 1.

The pre-circuit P of FIG. 1 is shown in more detail in FIG. 6 and comprises an input transformer T1 having input terminals 1, 1', an impedance-matched equalizing network suitable for SSB communication systems and having inductances, capacitances and resistances as shown, and a common emitter type transistor amplifier having a tuned low Q load tuned at the pulse frequency fundamental *fr*. Equalization shaping of this circuit provides a "differentiated orthognal shaping characteristic" and is performed particularly by the input equalizer E and the pre-amplifier A. Here the input transformer T1 is used only for balance-unbalance conversion and power separation. It need not have a wide bandwidth such as is conventional for interruption systems, it being sufficient to have a narrow transmission bandwidth with a high frequency cut-off point around the pulse fundamental frequency *fr* and low frequency cut-off point around *fr*/30 to *fr*/20. The pre-circuit of FIG. 6 constitutes one embodiment of the pre-circuit shown in FIG. 1.

Figure 7:
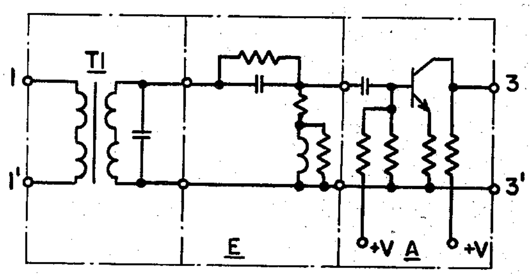
FIG. 7 is a detailed schematic diagram of another embodiment of the pre-circuit in FIG. 1 forming a part of the present invention.

The pre-circuit of FIG. 7 illustrates in detail another embodiment of the pre-circuit P in FIG. 1. Here the input transformer T1 constitutes a tuning transformer of comparatively low Q which is tuned to the pulse frequency *fr*. Contrary to FIG. 6 where the equalizer E is impedance matched, and has high precision equalizing characteristics such as is conventional in analog transmission, the equalizing circuit of FIG. 7 which is particularly suitable for pulse code modulation regenerating relay systems, is simple. It achieves the required equalizing characteristic with sufficient accuracy. In this case, the equalization shaping is accomplished specifically by the input transformer T1 and the input equalizer E.

The present invention also contemplates equalization shaping which is accomplished by the input equalizer E alone, the pre-amplifier A alone, or the combination of both.

Figure 8:
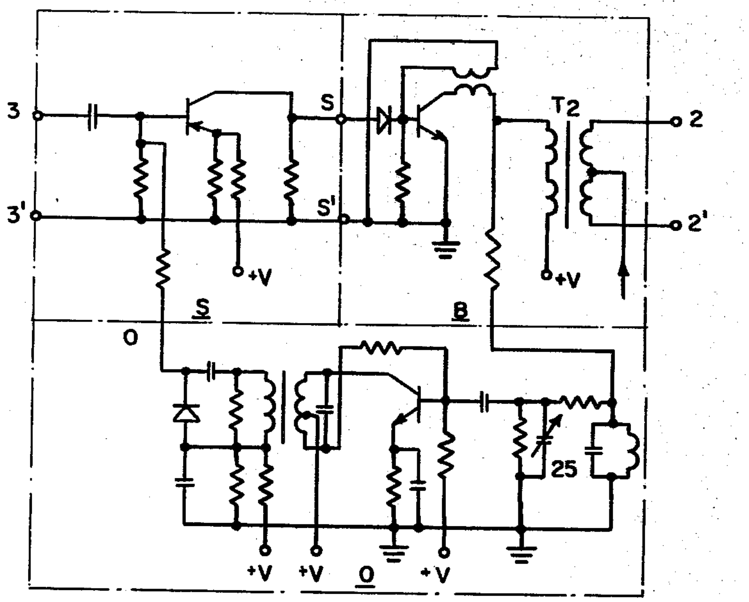
FIG. 8 is a circuit showing in detail the repeater circuit R in FIG. 1.

In FIG. 8 the waveform regenerative repeater of FIG. 1 comprises two input terminals 3, 3' and two output terminals 2, 2'. This circuit consists of three sections respectively designated S, B and O, constituting respectively the gate or timing circuit S, the regenerative amplifier B, and the time wave generating circuit O of FIG. 1. The gate or timing circuit S is comprised of a transistorized class C amplifier wherein the equalized wave 3*a* of the pre-circuit P and the timing wave 3*b* are added to generate triggering pips shown in FIG. 3*c*. The regenerative amplifier B consists of a monostable type transistor blocking oscillator which regenerates the waveforms corresponding to the input pulse train of FIG. 2*a*. The timing wave regenerating circuit O consists of a locked oscillator and clamping circuit which generates a timing wave of constant amplitude synchronized with the aforementioned regenerative amplifier output pulse pattern and supplies it to the retiming circuit S. The static phase of the timing wave is adjusted to be in phase with the equalized input wave by a CR phase shifter provided at the input side of the locked oscillator. The clamping circuit consists of a CR circuit, and a diode is provided at the output of the locked oscillator to supply the stable timing wave in which the direct current level is clamped to the retiming circuit.

In operation, the pre-circuit P equalizes and shapes the unidirectional inuput pulses to the differentiated shape shown by the curve *a* in FIG. 3. This is accomplished by virtue of circuit P having the characteristic shown in the graph *c* in FIG. 5. If the pre-circuit P had the usual characteristic shown by graph *c* in FIG. 4, the effect of the transformer T1 and the pre-circuit in general would be to produce the signals shown in curve *a* of FIG. 2, having considerable direct-current drift. The disadvantage of this drift will become evident from the following.

Figure 4:
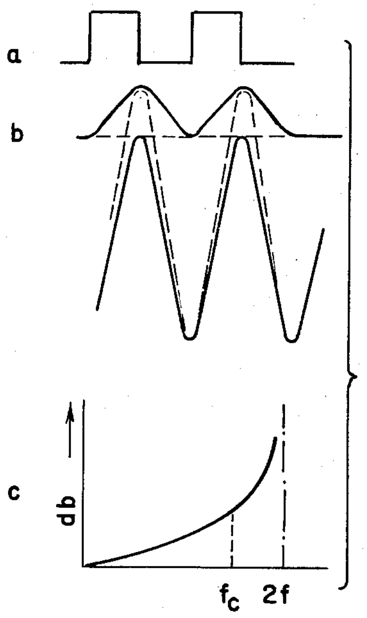
FIG. 4 is a group of graphs, *a, b* and *c* showing respectively the equalized waveforms, the summing process of the timing wave and equalization shaping characteristics, in conventional or known repeaters.

When the pre-circuit output signals enter the gate S they are passed through by the timing signals of curve *b* in FIGS. 2 or 3 and combine as shown by *b* in FIGS. 4 and 5. The ordinary equalized signals having D.-C. drift and comparatively slow rise times are not as sharply defined as the differentiated equalized signals; and thus may fail to pass through the gate S. Also the D.-C. drift may lower the absolute value of a pulse in the curve *a* of FIG. 2 to the point where its output *c* from the gate S is insufficient to produce an output pulse in the blocking oscillator B. This effect is shown in curves *c* and *d* of FIG. 2 representing respectively the output voltages of S and B for an ordinary equalized signal. However, this effect is avoided by the differentiated equalized signal as shown by the curves *c* and *d* in FIG. 3 and curve *b* in FIG. 5.

The invention effectively improves suppression of channel noise, especially low-frequency noise from the power supply or dial impulses, and furnishes a stable waveform regeneration system eliminating the variation of average D.-C. components in the pulse train.

In relay systems using balanced cables or performing power feed, the input and output transformers T1 and T2 are necessary for balance-unbalance conversion, impedance matching, or power separation. However, these transformers have some disadvantages in signals where the wave shape is non-symmetrical, such as binary code pulses; the average D.-C. component varies according to the content of the code. Thus, waveforms passing through transformer T1 lose their orthogonal characteristic between pulses as shown in FIG. 2*a*, and have the effect of positive and negative pulse trains causing peak-value variation and generating code errors and waveform distortions. In repeaters corresponding to those of FIG. 1, but without the differentiating characteristic of the pre-circuit, this presented a problem.

The variation of D.-C. component under those circumstances could have been improved simply by expanding the low-frequency characteristics of transformer T1 to the minimum repeating frequency of the binary coded pulse train, for example, down to 300 cycles per second. However, such transformers are expensive and large high capacitance condensers are required in the amplifier circuits of the repeater. Moreover, expanding the low-frequency characteristics of transformer T1 results in an increase of low-frequency noise from the power supply or dial impulses and deterioration of the signal to noise ratio. This is due generally to the local or trunk cables exhibiting noises of large peak-value ratio such as dial pulse noises greater than thermal noises which have flat frequency spectrums.

The invention, according to another one of its objects, limits the variation of the average D.-C. component of the pulse pattern resulting from low-frequency cut-off without extending the low-frequency characteristics of transformers.

Another way to achieve the above object is by a quantized feedback method. In most compensation methods, the secondary output of the output transformer in a repeater is fed back to the input of the repeater in reverse phase to cancel the transient. However, due to the low-frequency cut-off of the output transformer an adjustment circuit is required for the phase lag between the input and output in the regenerated amplification and compensation circuits so as to achieve feedback-loop stabilization. Thus, the circuit using quantized feedback is comparatively complicated.

Also capable of achieving this object, is the "bipolar pulse system," using as transmission codes dual polarity pulses which are plus and minus instead of the unipolar binary coded pulses. This reduces the D.-C. components of the coded pulses to zero. Also useful is the "alternate interchange method" in which ON or OFF information is transmitted by complementary codes having the phase difference $\pi$.

In either of these methods, supplementary circuits for code conversion are required. In the former, connection with binary coded pulse systems cannot be made because the unipolar pulses are used as sending pulses and the circuit becomes comparatively complicated. The latter method is effective with codes having large "self-relation" such as parallel code television signal transmission systems. However, they are not effective in multiplex transmission systems using the general series code.

According to the present invention, the system of FIG. 1 achieves complete orthogonality between pulses and a constant D.-C. level, by using as an equalization shaping characteristic of the input equalizer for the line, a band limit characteristic or a differentiated orthogonal shaping characteristic having orthogonal characteristic between pulses. It furnishes an added differential slope to the pulses, for example, such as a differential cosine squared characteristic $(\pi f/2fo)(1+\cos \pi f/2fo)$ in which $fo$ is the maximum repetition frequency of the binary codes as shown in FIG. 5*c*. This also improves the effect of low-frequency noise with differential slopes.

The response of the differential cosine-squared shaping circuit with the binary code pulse train is shown in FIG. 3*a* and the average D.-C. component of each shaped pulse becomes zero. Hereafter the cosine squared wave shape can be considered as representing all other orthogonal-type networks. In these shaped pulses code errors or waveform distortions in regenerative amplification and waveform distortion becomes almost zero. This is because the shaped pulses are completely orthogonal relative to adjacent pulses as in cosine squared waves. Furthermore, in differential cosine squared shaping, channel noises, particularly noises concentrated at low frequency, are considerably improved as compared with the cosine squared shaping method shown in FIG. 5*c*, by the differential slope 6 db per octave. Also there is an improvement with regard to thermal noise of 3 to 5 db at the same cut-off frequency, because the flat noise becomes triangle noise. Therefore, the effective inter-relay span can be extended.

Where such a system is used, the timing signal must occur at a time approximately $\pi/2$ earlier than with the system of cosine squared shaping. The peak point of the differential cosine squared shaped pulses shown in FIG. 5*b* occurs at a time $\pi/2$ prior to the cosine squared shaped pulses shown in FIG. 4*b*. According to the invention, the generator O is locked in with the output pulses which have already been shifted. In a circuit having a separate timing wave an adjustment must be made by including an appropriate fixed phase shifter into the timing circuit.

Equalization shaping of the line by the differential cosine squared characteristics are generally made by the input equalizer E. However, this can be accomplished by the input transformer or pre-amplifier A. The invention contemplates both of these methods; for example, the transformer T1 can easily be designed by using a tuning transformer for the input of transformer T1.

The system according to the present invention can be connected with conventional systems using unipolar binary pulses as in FIG. 3*d*.

In the conventional system using cosine squared shaping, pulse-width variation of the regenerated output pulse train results in variation of the amplitude and pulse width of the equalization shaped output waves as shown in FIG. 2*a*. This constitutes an effective waveform distortion. However, according to the present invention, only the time position of minus pulses for shaping waves shown in FIG. 5*a* is effected and there is no effect upon the amplitude and pulse width of the plus pulses used for code detection. Thus, stable regeneration amplification can be accomplished.

While an embodiment of the invention has been shown in detail, it will be obvious to those skilled in the art that the invention may be practiced otherwise.

We claim:

1. A regenerative relay system for transmitting digital code pulses comprising an input transformer for noise-affected code pulses, a differentiating pulse pre-shaping circuit connected to said input transformer and having a pulse output characteristic of the differentiated orthogonal type and having a slope having a differential cosine-squared characteristic, an output transformer, a wave-shape regenerating stage connecting said output transformer with said pulse pre-shaping circuit and including a timing circuit, and means for supplying to said timing circuit a timing wave of a given phase relation to the pulses to be regenerated.

2. A pulse code regenerative relay system comprising input means for receiving pulse code signals, coincidence means connected to said input means, timing means connected to said coincidence means for producing in said coincidence means pulse coded output signals corresponding to the received pulse code signals, output means connected to said coincidence means, said input means including differentiating means for adding to each of said pulse code signals a slope having a differential cosine-squared characteristic, said signal from said timing means being synchronous with the signal to said coincidence means from said input means.

3. A pulse code regenerative relay system comprising input means for receiving pulse code signals and having an input transformer and an equalizer as well as an amplifier, coincidence gate means having two inputs one of which is connected to said input means, a timing device connected to the other input of said coincidence gate means and having a frequency corresponding to the maximum frequency of said pulse code signals for producing in said coincidence gate means a repetition of said pulse code signals, differentiating means in said input means for reshaping the pulses of said pulse code signals and for adding to each of said pulse code signals a slope having a differential cosine-squared characteristic, the signals from said timing device being phased with said reshaped pulses.

4. A pulse code regenerative relay system comprising input means for receiving pulse code signals and having an input transformer and an equalizer as well as an amplifier, coincidence gate means having two inputs one of which is connected to said input means, a timing device connected to the other input of said coincidence gate means and having a frequency corresponding to the maximum frequency of said pulse code signals for producing in said coincidence gate means a repetition of said pulse code signals, said timing device being responsive to the output of said coincidence gate means, differentiating means in said input means for reshaping the pulses of said pulse code signals and for adding to each of said pulse code signals a slope having a differential cosine-squared characteristic, the signals from said timing device being phased with said reshaped pulses.

5. A regenerative relay system as claimed in claim 1, wherein said differential cosine-squared characteristic is $(\pi f/2fo)(1+\cos \pi f/2fo)$, where $fo$ is the maximum repetition frequency of said pulse code signals.

6. A pulse code regenerative relay system as claimed in claim 4, wherein said differential cosine-squared characteristic is $(\pi f/2fo)(1+\cos \pi f/2fo)$, where $fo$ is the maximum repetition frequency of said pulse code signals.

References Cited by the Examiner

UNITED STATES PATENTS

| | | | |
|---|---|---|---|
| 2,931,860 | 4/1960 | Cookingham | 178—70 |
| 2,996,578 | 8/1961 | Andrews | 178—70 |

ARTHUR GAUSS, *Primary Exminer.*

ROBERT H. ROSE, *Examiner.*

A. J. DUNN, J. JORDAN, *Assistant Exdminers.*